(12) United States Patent
Hoh et al.

(10) Patent No.: US 6,689,483 B1
(45) Date of Patent: Feb. 10, 2004

(54) PACKAGING COMPOSITION

(75) Inventors: George Lok Kwong Hoh, Wilmington, DE (US); David Richard Corbin, West Chester, PA (US); Steven B. Oblath, deceased, late of Hockessin, DE (US), by Deborah T. Oblath, legal representative

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/319,746

(22) PCT Filed: Dec. 10, 1997

(86) PCT No.: PCT/US97/22595
§ 371 (c)(1),
(2), (4) Date: Nov. 28, 2001

(87) PCT Pub. No.: WO98/25974
PCT Pub. Date: Jun. 18, 1998

Related U.S. Application Data

(60) Provisional application No. 60/032,554, filed on Dec. 12, 1996.

(51) Int. Cl.[7] .............................. C08F 6/10; C08F 8/00; C08F 20/02; B32B 27/32
(52) U.S. Cl. ...................... 428/522; 524/482; 525/370; 525/329.7; 525/330.2; 525/330.3
(58) Field of Search .......................... 524/482; 525/370, 525/329.7, 330.2, 330.3; 428/522

(56) References Cited

U.S. PATENT DOCUMENTS

| | | | |
|---|---|---|---|
| 3,264,272 A | 8/1966 | Rees | 260/78.5 |
| 3,355,319 A | 11/1967 | Rees | 117/122 |
| 3,404,134 A | 10/1968 | Rees | 260/78.5 |
| 4,095,031 A | 6/1978 | Engle | 526/1 |
| 4,316,819 A | 2/1982 | Tu et al. | 252/430 |
| 4,321,337 A | 3/1982 | Smith | 525/329 |
| 4,374,958 A | 2/1983 | Barnabeo | 525/384 |
| 4,761,437 A | 8/1988 | Christie | 523/102 |
| 4,795,482 A | 1/1989 | Gioffre | 55/75 |
| 4,892,720 A | 1/1990 | Skeels et al. | 423/328 |
| 5,211,870 A | 5/1993 | Gilbert et al. | 252/120 |
| 5,254,337 A | 10/1993 | Marcus et al. | 424/76.1 |
| 5,750,611 A | 5/1998 | Trouilhet | 524/450 |

FOREIGN PATENT DOCUMENTS

WO    WO 95/20624    8/1995

OTHER PUBLICATIONS

PCT International Search Report, dated Mar. 6, 1998.

*Primary Examiner*—Peter D. Mulcahy
(74) *Attorney, Agent, or Firm*—Kevin S. Dobson

(57) ABSTRACT

The present invention relates to an improved packaging composition comprising an ethylene copolymer selected from ethylene acid or ester copolymers such as ethylene vinyl acetate, ethylene/acrylic acid or methacrylic acid copolymers which optionally contain a third comonomer such as an alkyl acrylate and the corresponding ionomers of said copolymers which are blended with a hydrophilic zeolite to form a composition which removes residual acids or small esters from the polymeric or ionomeric composition containing such residual acids. The acids may be present as initial by products in the copolymerization process or may be degradation products. The use of these compositions is particularly important when the resins are formed into packages or other fabricated material which are exposed to acid sensitive material.

18 Claims, No Drawings

PACKAGING COMPOSITION

This application claims the benefit of provisional application No. 60/032,554 filed Dec. 12, 1996.

BACKGROUND OF THE INVENTION

1. Field of the Invention

The present invention relates to a process for removing residual acids including acetic acid and acrylic or methacrylic acids from ethylene copolymers such as ethylene vinyl acetate or ethylene acrylic acid or ethylene methacrylic acid or ionomers thereof. The process is also directed to the removal of residual monomeric alkyl acrylates which may be present in the ethylene copolymers.

2. Description of Related Art

Residual acids or monomeric alkyl acrylates formed during the production process of ethylene copolymers have presented a continual technical problem, especially if the packaging material or wire and cable material or other fabricated material is utilized to package or contain acid or monomeric alkyl acrylate sensitive contents or material.

The use of a certain kind of zeolite to remove offensive odors or flavors is known. For example, WO 95/20624 published on Aug. 3, 1995 describes the use of an adsorption agent which is added to films made from ethylene/acid copolymers to absorb odors. The siliceous material described therein is selected from those molecular sieves having a framework of tetrahedral oxide units, in which at least 90% of the tetrahedral oxide units are SiO tetrahedral, have a pore diameter greater than 5.5 Angstroms (preferably at least 6.0 Angstroms) and have a sorption capacity for water of less than 10% by weight at 25° C. and 4.6 Torr (preferably less than 6% by weight). The preferred sieves are also described as having a framework $SiO_2/Al_2O_3$ molar ratio of greater than 35, more preferably 200–500. This invention is also described in U.S. application Ser. No. 08/676,237. These molecular sieves are known to be hydrophobic in that they sorb less than 10 wt. % water at 25° C. and 4.6 Torr pressure.

The present invention, on the other hand, is directed to the use of a completely different molecular sieve for a particular purpose-the scavenging or removal or unwanted acid from ethylene copolymeric material which is utilized to contain or package acid or monomeric acrylate sensitive material. The recited molecular sieves utilized in this invention are hydrophilic in nature (e.g., absorb greater than 10% water at 25° C. and 4.6 Torr pressure) and are thus different than that described and used in the above patent publication.

BRIEF SUMMARY OF THE INVENTION

The present invention broadly relates to a process for removing unwanted acid or monomeric acrylate from an ethylene/acid copolymer comprising, i) preparing a thermoplastic composition comprising an ethylene/acid copolymer or ionomer thereof or an ethylene/acid/acrylate terpolymer or ionomer thereof or an ethylene/vinyl acetate copolymer wherein the composition contains residual acid, and ii) adding to the composition an acid scavenging agent selected from a hydrophilic molecular sieve which comprises a sodium aluminosilicate containing less than 5 wt. % of magnesium oxide and having a silica/alumina ratio of less than 100 and having a nominal pore diameter of 8–10 Angstroms. The preferred ratio is less than 35 and most preferred ratio is less than 3.0.

The invention further relates to a process as described above wherein the molecular sieve preferentially absorbs acetic acid over water.

The present invention also relates to a method for packaging or containing an acid sensitive material comprising, i) preparing a film or material comprising a thermoplastic composition comprising an ethylene/acid copolymer or ionomer thereof or an ethylene/acid/acrylate terpolymer or ionomer thereof or an ethylene/vinyl acetate copolymer and an acid scavenging agent selected from a hydrophilic molecular sieve which comprises a sodium aluminosilicate containing less than 5 wt. % of magnesium oxide and having a silica/alumina ratio of less than 100 (or less than 5 35 or less than 3.0) and having a nominal pore diameter of 8–10 Angstroms and ii) packaging said film or material with the acid sensitive material. The material to be packaged, such as surgical sutures, can be packaged in such a way that the packaged material does not actually contact the packaging surface but, the packaged material may still be exposed to fumes of acid which would come from the packaging material if the zeolite was not present.

The present invention also relates to a thermoplastic composition comprising an ethylene/acid copolymer or ionomer thereof or an ethylene/acid/acrylate terpolymer or ionomer thereof or an ethylene/vinyl acetate copolymer and an acid scavenging agent selected from a hydrophilic molecular sieve which comprises a sodium aluminosilicate containing less than 5 wt. % of magnesium oxide and having a silica/alumina ratio of less than 100 (or less than 35 or less than 3.0) and having a nominal pore diameter of 8–10 Angstroms. The invention also relates to a peelable seal composition comprising (a) a zeolite concentrate which comprises an ethylene acid copolymer or ionomer thereof and a hydrophilic molecular sieve which comprises a sodium aluminosilicate containing less than 5 wt. % of magnesium oxide and having a silica/alumina ratio of less than 100 (or less than 35 or less than 3.0) and having a nominal pore diameter of 8–10 Angstroms and (b) a blend of (i) an ethylene acid copolymer or ionomer thereof and (ii) a polyolefin resin selected from a homopolymer or copolymer of polybutylene or blends of such polymers with polypropylene; or a homopolymer or copolymer of polypropylene and further to this peelable composition coated onto an aluminum surface or a primed aluminum surface wherein the primer is selected from a mixture of ethylene acid copolymer or ionomer thereof and the above zeolite. The invention further relates to a composition as recited above wherein the molecular sieve preferentially absorbs acetic acid over water upon exposure of said composition to an aqueous/acetic acid environment.

The present invention additionally relates to a multilayer packaging structure comprising, (a) an innermost layer comprising a thermoplastic ethylene copolymeric composition comprising an ethylene copolymer and a zeolite selected from a molecular sieve which comprises a sodium aluminosilicate containing less than 5 wt. % of magnesium oxide and having a silica/alumina ratio of less than 100 (or less than 35 or less than 3.0) and having a nominal pore diameter of 8–10 Angstroms; and (b) at least one additional polymeric, metallic or nonmetallic layer. This additional polymeric layer may be selected from the same generic material as the inner layer (a) (e.g. both layers do not have to be but may be identical) or may be selected from a layer containing an ethylene copolymeric packaging material which is, for example, an ethylene/acid copolymer or ionomer containing film which does not have the molecular sieve contained therein or from a polyester or other common packaging material. Such materials are sold under the trade names NUCREL® (ethylene acid copolymer) or SURLYN® (ethylene acid ionomer). The metallic layer may be selected from a common packaging material such as aluminum. The multilayer structure can include additional layers as necessary to form the desired package provided that at least one of the layers is (a). The peelable seal composition described above can be extrusion coated onto a single layer or multilayer structure to form the multilayer structure containing said composition as a layer. The peelable seal composition can also be coextrusion coated onto an aluminum surface of a multilayer aluminum substrate wherein a tie layer having a tie composition is the coextrusion component and actually contacts the surface of the aluminum. The tie layer can comprise an ethylene acid copolymer/zeolite concentrate wherein the zeolite is type 13X.

DETAILED DESCRIPTION

As summarized above, the present invention relates to a thermoplastic ethylene copolymeric composition comprising an ethylene copolymer and a zeolite selected from a molecular sieve which comprises a sodium aluminosilicate containing less than 5 wt. % of magnesium oxide and having a silica/alumina ratio of less than 3.0 and having a nominal pore diameter of 8–10 Angstroms. This composition is particularly useful in the manufacture of articles which are ultimately destined to contain or package acid sensitive materials such as surgical sutures and the like.

The ethylene copolymers and terpolymers utilized herein are selected from a wide variety of commercially available polymers which incorporate ethylene as a basis monomeric unit and incorporate at least one additional comonomer selected from vinyl acetate, acrylic acid, methacrylic acid. Additional monomers may also form part of the polymeric structure and these may be selected from esters such as alkyl acrylates and the like. A common feature of the non-ethylene monomers is the presence of a carboxylic acid moiety or precursor to such moiety. Additional acid containing monomers may be selected from diacids such as maleic or fumaric acid or their anhydrides. The acid containing monomer may comprise up to fifty percent of the polymer. Methods of preparing such copolymers are disclosed in, for example, U.S. Pat. Nos. 3,264,272; 3,404,134; 3,355,319 and 4,321,337 which are hereby incorporated by reference. Examples of these polymers can be obtained commercially under the trade names ELVAX® (ethylene vinyl acetate) which is used in a variety of end use applications including as a major component in wires and cables; NUCREL® (ethylene/methacrylic acid copolymer optionally containing an additional softening monomer such as methyl acrylate) and SURLYN® which is a metal ionomer of the above ethylene methacrylic acid copolymer or terpolymer. Other alkyl acrylates may be selected from n-butyl acrylate or isobutylacrylate. Ionomers are neutralized either in whole or in part to form metal salts of the acid containing copolymers. These cations are generally selected from metals such as sodium or potassium or zinc or ther known metal salts or mixtures of these.

Preferred thermoplastic ethylene copolymers are selected from copolymers of ethylene and 2–50%, more preferably 5–25T, by weight of acrylic or methacrylic acid neutralized up to about 90%, more preferably 5–60% with an alkali metal ion or a divalent or trivalent metal ion, the melt index of the copolymer being about 0.1–30 or preferably about 0.5–20 dg/min. according to ASTM standard D1238. In addition to selection of these copolymers or terpolymers, the present invention may also include adhesive compositions containing an acid containing polymeric material such as an acid modified (grafted) polymeric material such as EPDM, EPR or other known material which is capable of being acid modified and incorporated into an adhesive composition. As suggested above, since the copolymers contain an acid containing monomer as a component, residual acid containing monomers may remain in the batch after polymerization and extrusion or blow molding of film or fabricated parts produced from such copolymeric material. The residual acid may also be a natural degradation product of the acid containing ethylene copolymer. Likewise, is adhesives containing an acid modified or anhydride modified ethylene copolymer such as those sold under the trademark BYNEL® may contain trace amounts of unreacted modifier or may contain decomposition products which include acid containing groups. In any case, the final film product or wire and cable or other fabricated part or material or adhesive contains an amount of acid which, absent incorporation of the molecular sieve described below, could affect or harm acid sensitive material which comes in contact with the film, fabricated part etc.

The molecular sieve suitable for use in the invention is selected from a hydrophilic sodium aluminosilicate containing less than 5 wt. % of magnesium oxide and has a silica/alumina ratio of less than 100 and a nominal pore diameter of eight to ten Angstroms. Preferred sieves have a silica/alumina ratio of less than 35 and the most preferred sieves have a ratio of less than 3.0. It is believed that functionality for acid scavenaging can be accomplished with the silica/alumina ratios described above. The preferred sieve is generically known as "Type 13X" and is sold under the name MOLSIV® 9356. This molecular sieve is typically utilized as a surface modifier for polyester film. Other molecular sieves which may also be suitable include products made by UOP sold under the trademark MOLSIV® 9356 and ABSCENTS® 1000 and 2000 which have silica/alumina ratios of less than 100. The molecular sieve has an average particle size of less than 5 microns. The molecular sieve is utilized and referred to as an "acid scavenger" which also includes adsorption of residual monomeric alkyl acrylates from the ethylene copolymers or terpolymers which form the other primary component of the composition.

The term "hydrophilic" is defined as those molecular sieves which absorb greater than 10% water at 25° C. and 4.6 Torr pressure.

The thermoplastic composition containing both the ethylene copolymers and the molecular sieve is generally prepared by mixing or blending (compounding) the components before extrusion or formation of a film, adhesive or fabricated part. The amount of molecular sieve added to the ethylene copolymer resin depends upon the particular acid content of the ethylene copolymer as well as the acid sensitivity of the product which is to be packaged or exposed to the packaging material made from the thermoplastic composition. Typically the sieve will comprise at least 0.5% by weight of the composition, more typically 0.5–2.0% by weight of the final film or end product and can also be made as a concentrate which is diluted with pure resin as needed. The ratios in this latter case will vary considerably. The amount of sieve in the final composition may also be as low as 0.1 wt. % if some acid removal is required.

In addition to the above-mentioned composition components, the composition or materials made therefrom may further include other additional components including polymeric components as well as ingredients or additives conventionally employed in the art for various purposes in polymer compositions, such as dyes, pigments, fillers, antioxidants, fire-retarding agents etc. When such optional excipients are included, they are present in a weight percentage or loading level that is typical for that particular excipient.

Films, adhesives, wire and cable elements or other fabricated parts containing the above thermoplastic compositions are prepared according to conventional means such as extrusion, blow molding, cast film processing or injection molding. Peelable seal layers as packaging material may be formed from the thermoplastic composition and used to package or wrap acid sensitive materials such as surgical sutures. Film layers made from the compositions of the invention may be utilized as the internal layer of a multilayer structure which is utilized to wrap or package acid sensitive material. Absorption of the acid or acid material internally (from within the polymer in the form of a composition as claimed herein) prior to its use as a packaging material is superior to placement of an acid-scavenging coupon within the package along with the acid sensitive material. In the latter case, acidic vapors from an untreated polymer can migrate into the headspace of the package and contact the acid sensitive product prior to absorption by the coupon. A similar situation occurs when it is desired to absorb unpolymerized monomer from the polymer prior to its use as a packaging material.

In the case of ethylene/vinyl acetate wire and cable insulation, the process of vulcanizing a semiconductive composition made from this polymer usually is carried out at a temperature at which the polymer is not very stable. The instability is evidenced by liberation of acetic acid that can cause corrision of the metallic conductor and thus, premature failure. Incorporation of the acid-scavenging agent prevents the acetic acid from contacting the conductor and therefore contributes to maintaining maximum use life.

EXAMPLES

Below are examples of the use of a powdered hydrophilic zeolite to remove low molecular-weight organic materials from ethylene copolymer resins, especially acids such as acetic and methacrylic acids, and monomers such as isobutyl acrylate. The removal capability of the zeolite is important in certain end-use applications where the presence of these organic materials are detrimental. Examples of such end uses are in the packaging of certain medical diagnostic test kits, where the acids interfere with the test chemicals and cause incorrect results; in the packaging of acid-sensitive materials such as absorbable surgical sutures and implantable medical devices such as screws that are made from lactide polymers, where acidic materials from the packaging transferred in the vapor phase causes premature loss of physical properties of the packaged product; in the compounding, extrusion, curing, and end-use of wire insulation compounds made from EVA resins, where the thermal degradation of the EVA resin causes liberation of wire-corroding acetic acid; and in the removal of residual acrylate monomer from polymers containing these monomers for organoleptic reasons for food packaging.

Example 1

Earlier work had shown that hydrophobic zeolites added to an ionomer resin did not completely remove undesired acetic acid. For instance, in headspace testing of packages made from aluminum foil coated with a zinc ionomer, it was found that unmodified ionomer gave 335 ng/package of acetic acid. Addition of 0.5 wt. % of hydrophobic zeolite reduced the acetic acid level to 334 ng, and addition of 2.0 wt. % reduced the level to 188 ng.

Screening experiments were carried out to test the efficacy of different powdered hydrophilic zeolites for removal of acetic acid. The types screened are known generically as types 4A, 5A, and 13X. An initial screening showed that type 4A zeolite had a lower total sorption capacity than the other two. More detailed comparisons were carried out on types 5A and 13X. All of these tests employed headspace gas chromatography, to analyze and quantify the components in the vapor space above a sample. 25 In these experiments, 18–19 milligrams (mg) of the selected zeolite sample was placed in a headspace sample vial that was sealed with a cap having a rubber septum. A solution was made up in a 25 ml volumetric flask containing 12.54 g of water and 13.90 g of acetic acid. Following mixing, either 1, 3, or 5 microliters ($\mu$l) of solution were injected into a vial containing the test zeolite, a process called "spiking". The headspace above the sample was then analyzed on the same day as the day of spiking (Day 1), or on the day following (Day 2).

Table 1 shows the results of these analyses. Examination of the Day 1 data for the samples shows that the capacity of type 13X zeolite for the combination of water and acetic acid is greater than that of type 5A. More importantly, the type 13X zeolite shows on Day 1 a higher capacity for sorption of acetic acid, although type 5A shows a higher capacity for sorption of water. These data are confirmed more dramatically on Day 2, showing a shift in the equilibrium sorption of the two sorbates. Type 13X is seen to absorb less water than on Day 1, but the absorption of acetic acid increases from 56% to 100% at the highest 5 $\mu$l spiking level. The absorption of both water and acetic acid by the type 5A sample is increased on Day 2, but at the highest spiking level of 5 $\mu$l, the acetic acid removal is only 17% compared to 100% for the type 13X sample. These data show that type 13X is superior to type 5A in removing undesirable acetic acid. The preferential absorption of acetic acid vs. water for type 13X zeolite was also unexpected.

Example 2

Commercial type 13X zeolite powder having an average particle size of less than 5 microns (u) was compounded with three different carrier resins to make concentrates containing 20 wt. % zeolite. The carrier resins were: (1) EMAA copolymer containing 9 wt. % MAA (E=ethylene; MAA=methacrylic acid) and having a melt flow index of 10; (2) EMAA copolymer containing 4 wt. % MAA and having a melt flow index of 11; (3) EVA copolymer containing 32 wt. % VA and having a melt flow index of 43.

The resin and zeolite were added to the hopper of a 30 mm co-rotating twin-screw extruder using gravimetric feeders to form a pre-extruded composition of the invention. A nitrogen blanket was used on the extruder hopper. The extruder screws were set up with a moderate mixing profile. The zone temperatures of the extruder were set, from rear to front, at 130, 150, 190, 30 and 195° C. The single-hole extrusion die was also set at 195° C. The strand of molten compound exiting the die was cooled in a water bath. The excess water was stripped from the strand using air knives, and then the strand was passed into a strand pelletizer. The cut pellets were collected in a container equipped with a sparge tube that allowed dry nitrogen to be passed through the bed of collected pellets. Melt flow index analyses of the products gave values of 5.5, 4.3, and 21.3 9/10 min for the above carrier resins, respectively. Ash analyses gave values of 19.6, 20.2, and 21.4 wt. % zeolite in the product concentrates, respectively.

To determine the acid-removal efficacy of the concentrate made with carrier resin (1), above, comparison extruded sheet was made from a 5 MFI zinc ionomer resin known to contain a high level of acidic volatiles. Sheet was extruded without and with added concentrate. A 1.5 in. single-screw extruder equipped with a mixing screw was set at the following barrel temperature profile, from rear to front: 132, 149, 190 and 199° C. An attached 8-in. wide sheet die was also set at 199° C. A sample of the ionomer resin was taken from its shipping container and extruded into sheet of approximately 4 mils thickness at a melt temperature of 1 88° C. The extruded sheet was quenched on a chill roll and immediately packaged in hermetically-sealed barrier packaging.

Following extrusion of the above control resin, an extrusion was carried out with a blend of 90 wt. % of the control resin and 10 wt. % of the concentrate made from the carrier resin (1), above. The final blend would contain approximately 2 wt. % of the hydrophilic zeolite. The dry blend of the pellets were placed in the extruder hopper and extruded in a manner identical to that of the control. While extrudate from the control was clear, the melt from the blend was cloudy, showing the presence of the zeolite. This product sheet was also packaged hermetically in barrier bags.

Multiple extraction headspace gas chromatography was used to quantify volatiles from the control sheet, particularly for acetic and methacrylic acids. In this technique, a sample of the sheet is placed in a headspace sample vial equipped with a rubber septum. The samples were then heated at 150° C. for extraction times of 60 min. A three-point extraction gave values of 420 parts-per-million (ppm) of acetic acid and 150 ppm of methacrylic acid.

The control sheet and the sheet containing 2 wt. % zeolite was also tested using conventional headspace gas chromatography at a 60° C. extraction temperature. Different zeolite-containing sheets were heated for 30, 60, or 120 min. While the control sheet gave a chromatogram showing the peaks of acetic and methacrylic acids plus those of other unidentified compounds, the zeolite-containing sheets showed neither of these acids in the vapor space above the samples.

One peak for an unidentified material appeared in the chromatograms for samples heated for 30 and 60 min. This peak was no longer observed at the 120 min. heating time.

This example demonstrates the acid scavenging effect of the composition containing the hydrophilic zeolite of the invention.

Example 3

Another concentrate of the type described in Example (2), Type (1), having a carrier resin of a 9 wt. % MAA-content EMAA copolymer, 10 MFI or a carrier resin of 12 wt. % MAA-content EMAA copolymer, 14 MFI, was compounded with 30 wt. % of the same type 13X zeolite. A twin-screw extruder was also employed for making this compound in much the same manner as employed in Example 2. A peelable seal composition was compounded using 7 wt. % of this concentrate, 71.2 wt. % of an ethylene/methacrylic acid (15%) zinc ionomer (neutralized with approximately 20% zinc), 17.8 wt. % of a commercial butylene-ethylene copolymer blended with polypropylene made by Shell Chemical, and 4 wt. % of a concentrate of an EMAA copolymer containing 1.0 wt. % of a hindered phenol antioxidant made by Ciba-Geigy. The same twin-screw extruder used to make the zeolite concentrate was used to prepare the peelable seal composition. This peelable seal composition was coextrusion coated with a tie layer onto the aluminum surface of a composite film made of a primed oriented polyester resin film extrusion laminated to aluminum foil with LDPE. The tie layer was in contact with the aluminum surface to form the multilayer structure wherein the innermost layer would be the peelable seal composition layer in a package made from this material. The LDPE layer was in between the primed polyester layer and the aluminum layer.

The tie layer resin was made with 7 wt. % of the zeolite concentrate, 4 wt. % of the antioxidant concentrate, and 89 wt. % of a 9 wt. % MAA, EMAA resin. This resin was also melt compounded with the twin-screw extruder and pelletized. Headspace gas chromatographic testing of pellets of this tie layer resin without zeolite showed the presence of both acetic and methacrylic acids as shown by their peaks in the gas chromatogram. Testing of the compounded tie layer pellets that contained zeolite and antioxidant showed that the acetic and methacrylic acids had been removed from the resin, as shown by the disappearance of the peaks for these materials in the chromatogram.

Another oriented polyester/aluminum foil composite web was coated using a pre-compounded 5 MFI zinc ionomer selected from an ethylene/methacrylic acid (9%) zinc ionomer resin (neutralized with approximately 20% zinc) containing 7 wt. % of the zeolite concentrate. This web was then sealed to the web described in the previous paragraph having the peelable seal coextrusion coating. The heat sealer, equipped with 1" wide sealing bars, was set at 60 psi air pressure and a jaw closure dwell time of 2 sec. Seals which peeled at a force of 3 to 4 lb/in width were obtained at bar temperatures ranging from 105 to 170° C. Failure of the seals was at the interface of the sealing layers. The surface of the peeled samples exhibited "blushing" or whitening of the peeled surfaces. This example demonstrates that there was a very good heat seal between the innermost layer of the oriented polyester/aluminum foil composite web (multilayer structure having the peelable seal composition) and the web described above and is thus useful as a peelable material in those end uses that require this kind of performance (e.g. like suture packages and the like).

Example 4

A concentrate containing 30 wt. % of the type 13X zeolite used in prior examples was compounded with 0.5 wt. % of hindered phenol antioxidant in the 9 wt. % MAA-content EMAA copolymer, 10 MFI. A Banbury was used to compound these ingredients. At the end of the blending cycle, the product was discharged and transferred into an extruder that fed an underwater pelletizer. The melt-cut pellets were dewatered, screened to remove fines and agglomerates, dried, and packaged.

The pellets from this production were tested for efficacy in sorption of acetic acid. Headspace gas chromatography was used, and the acetic acid was not directly placed on the pellets, but transferred in the vapor phase. The pellet samples and various quantities of acetic acid were held at 60° C. for these tests. At the 1 wt. % acetic acid addition level, 100% removal was obtained within a 24 hr. holding period. At the 2 wt. % addition level, 99.9% removal was obtained after 24 hrs., and by 4 days the removal was 100%. At the 3 wt. % addition level, 99.9% removal was obtained in 24 hrs., and 100% within 4 days.

Example 5

A peelable seal layer composition similar to that of Example 3 was compounded using the zeolite concentrate of Example 4. The following resins were compounded in a twin-screw extruder and pelletized: 10 wt. % of the zeolite concentrate of Example 4; 65 wt. % of the zinc ionomer of example 3 having an MFI of 14; and 25 wt. % of the same blend of polypropylene with butylene-ethylene copolymer of Example 3. In a manner similar to that of Example 3, the resin was coextrusion coated onto the foil side of a composite film of oriented polyester laminated to foil. A tie layer of 9 wt. % MAA-content EMAA resin containing 10 wt. % of the zeolite concentrate of Example 4 was used. During the course of coating, several small sheets of unprimed polyester resin ("slipsheet") was placed between the melt and the substrate. Because the melt did not bond to the unprimed polyester, it would allow the coating layers to be isolated at a later time.

A sample of the coated structure containing the slipsheets was removed from the coated rollstock and wrapped in aluminum foil so that any volatiles from the structure would be contained within the package. The package was transported to the gas chromatographic testing location, where the coating was separated from the slipsheet and the rest of the web structure. A portion of the coating in film form was placed in a headspace test vial. Headspace testing as described in Example 3 was carried out on the isolated film. The testing showed that peaks due to acetic or methacrylic acid were absent.

Example 6

A peelable seal layer composition, (A), intended for sealing lidding membranes to thermoformed plastic containers was prepared by melt blending the following components: 45 wt. % of an ethylene terpolymer containing 10 wt. % isobutyl acrylate and 10 wt. % MAA at a MFI of 35; 15 wt. % of a hydrogenated hydrocarbon tackifying resin having a ring-and-ball softening point of 125° C.; 25 wt. % of a low density polyethylene resin having a density of 0.915 and a Ml of 15; 10 wt. % of a very low-density polyethylene resin having a density of 0.900 and a Ml of 3.5; and 5 wt. % of a concentrate having a carrier resin consisting of a 9 wt. % MAA, EMAA copolymer at a MFI of 10 and containing 11 wt. % of N-oleyl palmitamide and 4 wt. % of behenamide.

A second composition, (B), was made up similar to the above, except that the respective percentages of the components were: 40, 15, 23, 10, 5, and additionally, 7 wt. % of the zeolite concentrate of Example 4.

The above compositions were coated onto aluminum foil. At a sealing temperature of 121 ° C., 40 psi air pressure, and a heat sealing dwell time of 1 sec., composition (A) sealed to itself gave an average seal strength of 2.2 lb/in while composition (B) gave an average of 2.1 lb/in. At a sealing temperature of 149 ° C., (A) gave an average 3.2 lb/in and (B) gave an average 3.1 lb/in. The foil adhesion of coating (A) immediately after coating was 1.3 lb/in, increasing to 1.4 lb/in after one week. The foil adhesion of coating (B) for these same times was 1.6 and 1.9, respectively.

The odor of the two resin pellet samples was compared by a sensory panel. A rating of 0 indicates the best (lowest) odor, while a rating of 8 indicates the worst (highest) odor. Much of the odor is due to residual unpolymerized isobutyl acrylate in the ethylene terpolymer resin. The human nose can detect very low concentrations of this material. The pellets of (A) were rated 3.2 by the panel, while the pellets of (B) were rated 1.5. These organoleptic scores indicate a substantial reduction of the odor of the composition containing the zeolite.

Example 7

This example relates to the use of type 13X zeolite for removal of acetic acid generated in the course of extrusion, vulcanization, and use of EVA semiconductive compounds for electrical cable sheathing.

It is known that EVA resins are sensitive to thermal degradation, liberating acetic acid and forming unsaturation in the polymer backbone when the resin is exposed to elevated temperatures. The Material Safety Data Sheet for EVA resins states that the resins should not be exposed to temperatures above 230° C. for short periods of time nor over 204° C. for long periods of time.

For coating of metallic electrical wiring, liberation of acetic acid from the insulation is undesirable because of its corrosive effect on the conductor. Incorporation of the zeolite into the EVA insulation composition at a level of less than 1.1 wt. % is able to scavenge more than 99% of acetic acid liberated at a test temperature of 140° C. Zeolite concentrate as described in Example 2, type (3), was used as a convenient means of adding zeolite to the composition. A control sample not containing zeolite was found to liberate 370 µg of acetic acid per gram of compound under the same test conditions.

The above examples are non-limiting and effectively show that any ethylene acid copolymer or ionomer derived therefrom including terpolymers which has or may develop an acidic or mono alkyl ester residue can be blended or treated with the 13X molecular sieve to effectively remove these contaminants. This composition is therefore particularly useful in those packaging or fabricated part applications which ultimately contain acid or low pH sensitive material. Of course, this composition can be blended with other polymeric materials which together form the packaging material.

TABLE 1

Sorption of Water and Acetic Acid by Types 13X and 5A Molecular Sieves*

| Type | Water | | | Acetic Acid | | |
|---|---|---|---|---|---|---|
| | Spike, µg | µg remain | % Sorbed | Spike, µg | µg remain | % Sorbed |
| Analyses Carried Out the Same Day as Spiking | | | | | | |
| 13X | 502 | 0 | 100 | 556 | 0 | 100 |
| | 1500 | 0 | 100 | 1570 | 0 | 100 |
| | 2510 | 805 | 68 | 2780 | 1230 | 56 |
| 5A | 502 | 0 | 100 | 556 | 0 | 100 |
| | 1500 | 105 | 93 | 1670 | 1390 | 17 |
| | 2510 | 600 | 76 | 2780 | 2780 | 0 |
| Analyses Carried Out the Day After Spiking | | | | | | |
| 13X | 502 | 0 | 100 | 556 | 0 | 100 |
| | 1500 | 23 | 98 | 1670 | 0 | 100 |
| | 2510 | 1600 | 36 | 2780 | 0 | 100 |
| 5A | 502 | 0 | 100 | 556 | 0 | 100 |
| | 1500 | 0 | 100 | 1670 | 320 | 81 |
| | 2510 | 160 | 94 | 2780 | 2300 | 17 |

*Test Methodology

Gas chromatographic headspace vials were filled with 18 to 19 mg of the test molecular sieve (zeolite) sample. A solution containing 12.54 g of water and 13.90 g of acetic acid was made up in a 25 ml volumetric flask. To each vial was added 1, 3, or 5 μl (microliters) of solution. These addition "spikes" gave the paired amounts of water and acetic acid for each test sample. The vials were then analyzed either on the same day of spiking, or the following day, to give the results shown. Value given are μg (micrograms) remaining, or the percent of water or acetic acid absorved.

What is claimed is:

1. A process for removing unwanted acid or monomeric acrylate from an ethylene/acid copolymer comprising,
    i) preparing a thermoplastic composition comprising an ethylene/acid copolymer or ionomer thereof or an ethylene/acid/acrylate terpolymer or ionomer thereof or an ethylene/vinyl acetate copolymer wherein the composition contains residual acid, and
    ii) adding to the composition an acid scavenging agent selected from a hydrophilic molecular sieve which comprises a sodium aluminosilicate containing less than 5 wt. % of magnesium oxide and having a silica/alumina ratio of less than 100 and having a nominal pore diameter of 8–10 Angstroms.

2. The process according to claim 1 wherein the thermoplastic composition has a melt flow index (MFI) of greater than 0.7 decigrams/min.

3. The process according to claim 1 wherein the ethylene copolymer is selected from an ethylene acrylic acid or ethylene methacrylic acid copolymer with an ethylene content of at least 50% and the ionomer is selected from co- or terpolymers of ethylene with acrylic or methacrylic acid wherein at least 5% of the acid groups on the co- or terpolymer are neutralized with a mono-or divalent metal ion and the ethylene content is at least 60 wt. %.

4. The process according to claim 3 wherein the metal ion is selected from zinc or sodium and the amount of neutralization with said metal is from 10 to 60%, wherein the acid content of the ionomer ranges from 4 to 35 wt. %, and an optional termonomer, if present, is selected from alkyl acrylates or methacrylates or vinyl acetate, in a wt. % range of 1–30 wherein the ethylene content of the ionomer is at least 60 wt. %.

5. The process according to claim 1 wherein the molecular sieve preferentially absorbs acetic acid over water.

6. The process according to claim 1 wherein the silica/alumina ratio is less than 35.

7. The process according to claim 6 wherein the silica/alumina ratio is less than 3.0.

8. A method for packaging or containing an acid sensitive material comprising,
    i) preparing a film or material comprising
        a thermoplastic composition comprising an ethylene/acid copolymer or ionomer thereof or an ethylene/acid/acrylate terpolymer or ionomer thereof or an ethylene/vinyl acetate copolymer and
        an acid scavenging agent selected from a hydrophilic molecular sieve which comprises a sodium aluminosilicate containing less than 5 wt. % of magnesium oxide and having a silica/alumina ratio of less than 100 and having a nominal pore diameter of 8–10 Angstroms and
    ii) packaging the acid sensitive material with said film or material.

9. The method according to claim 8 wherein the ionomer is selected from a co- or terpolymer of ethylene with acrylic acid or methacrylic acid, wherein at least 5% of the acid groups on the ionomer are neutralized with a mono- or divalent metal ion and the ethylene content is at least 60 wt. %.

10. The method according to claim 8 wherein the acid sensitive material is a suture.

11. A thermoplastic composition comprising,
    an ethylene/acid copolymer or ionomer thereof or an ethylene/acid/acrylate terpolymer or ionomer thereof or an ethylene/vinyl acetate copolymer and,
    an acid scavenging agent selected from a hydrophilic molecular sieve which comprises a sodium aluminosilicate containing less than 5 wt. % of magnesium oxide and having a silica/alumina ratio of less than 100 and having a nominal pore diameter of 8–10 Angstroms.

12. A composition according to claim 11 wherein the silica/alumina ratio is less than 35.

13. A composition according to claim 11 wherein the molecular sieve is present in a wt. % relative to the total composition of 0.1–30%.

14. A composition according to claim 11 having an MFI of between 1 and 30 decigrams/min.

15. A composition according to claim 11 wherein the molecular sieve preferentially absorbs acetic acid over water upon exposure of said composition to an aqueous/acetic acid environment.

16. A peelable seal composition, comprising
    (a) an ethylene/acid copolymer or ionomer thereof or an ethylene/acid/acrylate terpolymer or ionomer thereof or an ethylene/vinyl acetate copolymer and,
    an acid scavenging agent selected from a hydrophilic molecular sieve which comprises a sodium aluminosilicate containing less than 5 wt. % of magnesium oxide and having a silica/alumina ratio of less than 100 and having a nominal pore diameter of 8–10 Angstroms; and
    (b) a mixture of (i) a polyolefin resin selected from a homopolymer or copolymer of polybutylene or blends of said polymers with a polypropylene; or a homopolymer or copolymer of polypropylene and (ii) an ethylene acid copolymer or ionomer thereof.

17. A multilayer packaging structure comprising,
    (a) an innermost layer comprising a thermoplastic ethylene copolymeric composition comprising an ethylene acid copolymer or terpolymer of ionomer thereof and a zeolite selected from a molecular sieve which comprises a sodium aluminosilicate containing less than 5 wt. % of magnesium oxide and having a silica/alumina ratio of less than 100 and having a nominal pore diameter of 8–10 Angstroms; and
    (b) at least one additional polymeric or metallic or non-metallic layer.

18. The multilayer structure according to claim 17 wherein the additional polymeric layer may be selected from a thermoplastic ethylene copolymeric composition comprising an ethylene acid copolymer or terpolymer or ionomer thereof and a zeolite selected from a molecular sieve which comprises a sodium aluminosilicate containing less than 5 wt. % of magnesium oxide and having a silica/alumina ratio of less than 35 or
    may be selected from a layer containing an ethylene copolymeric packaging material which is an ethylene/acid copolymer or ionomer containing film which does not have the molecular sieve contained therein or other polymeric material such as polyester and the metal layer may be selected from aluminum.

* * * * *